(12) United States Patent
Sugita et al.

(10) Patent No.: US 8,466,894 B2
(45) Date of Patent: Jun. 18, 2013

(54) APPARATUS AND METHOD FOR DISPLAYING INFORMATION

(75) Inventors: Kaoru Sugita, Saitama-ken (JP); Yasunobu Yamauchi, Kanagawa-ken (JP); Yasuhiro Yanaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 323 days.

(21) Appl. No.: 13/020,353

(22) Filed: Feb. 3, 2011

(65) Prior Publication Data

US 2012/0026108 A1 Feb. 2, 2012

(30) Foreign Application Priority Data

Jul. 30, 2010 (JP) ................................ 2010-172734

(51) Int. Cl.
*G06F 3/041* (2006.01)
(52) U.S. Cl.
USPC ................ 345/173; 348/39; 348/170; 463/34
(58) Field of Classification Search
USPC .................. 345/173; 178/18.01; 348/39, 170, 348/211.1, 602; 701/24, 408; 463/33, 37
See application file for complete search history.

(56) References Cited

U.S. PATENT DOCUMENTS

| | | | | |
|---|---|---|---|---|
| 5,969,725 | A * | 10/1999 | Fujiki et al. | 345/619 |
| 7,557,736 | B1 | 7/2009 | Daily et al. | |
| 7,711,478 | B2 * | 5/2010 | Gluck | 701/436 |
| 8,355,019 | B2 * | 1/2013 | Eichenlaub | 345/419 |
| 2004/0051680 | A1 | 3/2004 | Azuma et al. | |
| 2006/0262140 | A1 | 11/2006 | Kujawa et al. | |
| 2007/0027591 | A1 | 2/2007 | Goldenberg et al. | |
| 2008/0021636 | A1 | 1/2008 | Stavaeus et al. | |
| 2009/0216446 | A1 | 8/2009 | Ma et al. | |
| 2009/0293012 | A1 | 11/2009 | Alter et al. | |
| 2010/0188355 | A1 | 7/2010 | Sugita et al. | |
| 2010/0214635 | A1 | 8/2010 | Sasaki et al. | |

FOREIGN PATENT DOCUMENTS

| | | |
|---|---|---|
| JP | 04-085512 | 3/1992 |
| JP | 07-239750 | 9/1995 |
| JP | 10148535 | 6/1998 |
| JP | 2003-216982 | 7/2003 |
| JP | 2003-264740 | 9/2003 |
| JP | 2004-178554 | 6/2004 |
| JP | 2005-250560 | 9/2005 |
| JP | 2008-259880 | 10/2008 |
| JP | 2009128565 | 6/2009 |
| JP | 2010-066042 | 3/2010 |
| JP | 2010-118019 | 5/2010 |
| WO | 2007/090660 A1 | 8/2007 |

\* cited by examiner

OTHER PUBLICATIONS

Japanese Office Action for Japanese Application No. 2010-172734 mailed on Jun. 15, 2012.

*Primary Examiner* — Abbas Abdulselam
(74) *Attorney, Agent, or Firm* — Turocy & Watson, LLP

(57) ABSTRACT

According to one embodiment, an information display apparatus includes a display unit, a storage unit, a view point calculation unit, a region estimation unit, and an extraction unit. A scene surrounding the display unit is visible through the display unit. The storage unit is configured to store a location and a guide of each object existing in the scene. The view point calculation unit is configured to calculate a view point of a user observing the scene through the display unit. The region estimation unit is configured to estimate a region observed by the user in the scene, based on the view point. The extraction unit is configured to search an object existing in the region based on the location of the object, and to extract the guide of the object from the storage unit. The display unit displays the guide extracted.

5 Claims, 14 Drawing Sheets

|  | GUIDE INFORMATION | | |
|---|---|---|---|
| OBJECT ID | NAME | EXPLANATION | LOCATION INFORMATION |
| 001 | ○○ MOUNTAIN | THIS MOUNTAIN HAS 2500 METERS ABOVE THE SEA, ⋯ | $(\theta_1, h_1) - (\theta_2, h_2)$ |
| 002 | △△ TOWER | THIS TOWER WAS CONSTRUCTED IN 1964, ⋯ | $(\theta_3, h_3) - (\theta_4, h_4)$ |
| ⋮ | ⋮ | ⋮ | ⋮ |

FIG. 5

APPARATUS AND METHOD FOR DISPLAYING INFORMATION

CROSS-REFERENCE TO RELATED APPLICATION

This application is based upon and claims the benefit of priority from Japanese Patent Application No. 2010-172734, filed on Jul. 30, 2010; the entire contents of which are incorporated herein by reference.

FIELD

Embodiments described herein relate generally to an apparatus and a method for displaying information.

BACKGROUND

In actual scene, an information display apparatus for displaying information to a user is widely used. For example, the information display apparatus presents a name or an explanation of a specific object indicated by the user. As to this information display apparatus, one having higher utility for the user is desired.

BRIEF DESCRIPTION OF THE DRAWINGS

FIG. 5 is a schematic diagram of one example of the geographical information.

DETAILED DESCRIPTION

Figure 1:
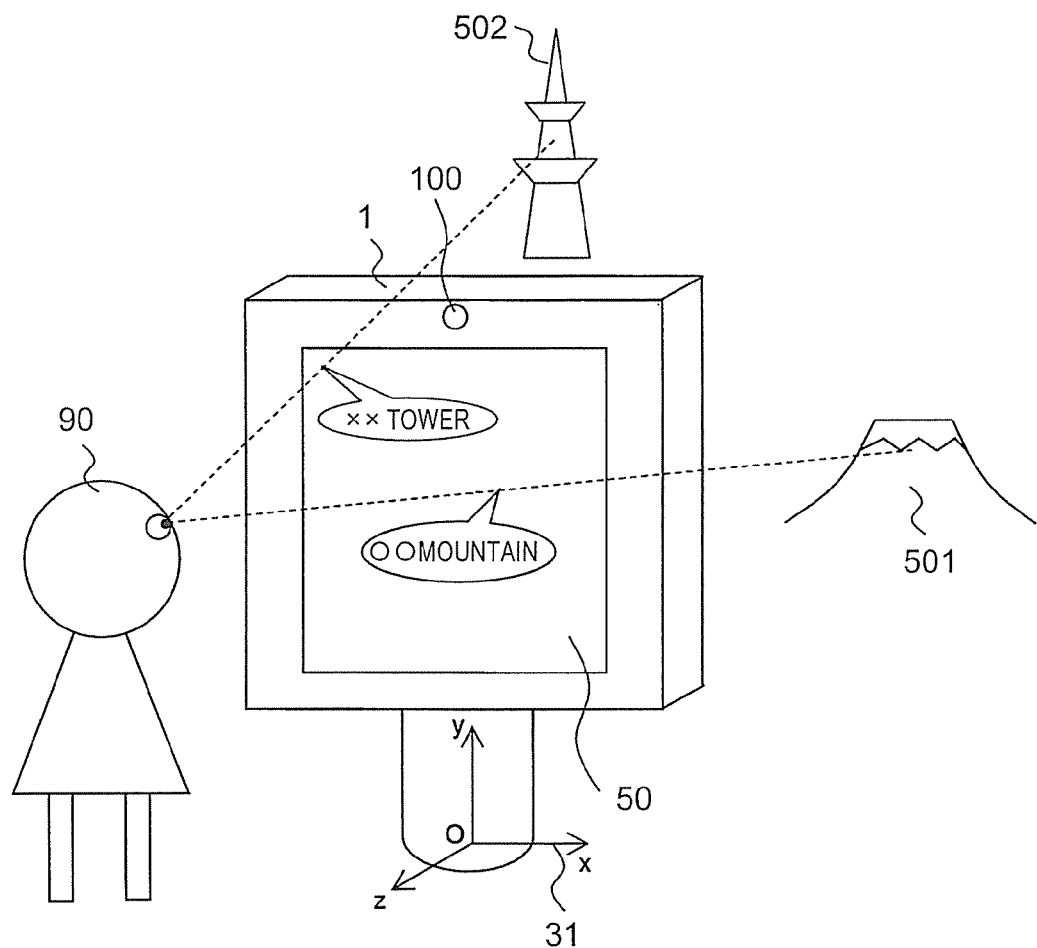
FIG. 1 is a schematic diagram showing a usage example of an information display apparatus 1 according to a first embodiment.

In general, according to one embodiment, an information display apparatus includes a display unit, a storage unit, a view point calculation unit, a region estimation unit, and an extraction unit. A scene surrounding the display unit is visible through the display unit. The storage unit is configured to store a location and a guide of each object existing in the scene. The view point calculation unit is configured to calculate a view point of a user observing the scene through the display unit. The region estimation unit is configured to estimate a region observed by the user in the scene, based on the view point. The extraction unit is configured to search an object existing in the region based on the location of the object, and to extract the guide of the object from the storage unit. The display unit displays the guide extracted.

Hereinafter, embodiments of the present invention will be explained by referring to the drawings. The present invention is not limited to the following embodiments.

The First Embodiment

As to the first embodiment, for example, the information display apparatus 1 is set at a tourist resort, and used for an information kiosk terminal to guide sight-seeing by presenting information such as famous buildings or natural things.

As shown in FIG. 1, the information display apparatus 1 includes a display unit 50 having a transparent screen. A user 90 observes a scene through the display unit 50.

In the information display apparatus 1, from a view point of the user 90, at least one object included (existing) in a scene observed by the user 90 through the display unit 50 are estimated, and information such as a name or an explanation of the object are displayed on the display unit 50. By this processing, the user 90 can perceive the information overlaid on the object observed.

Figure 2:
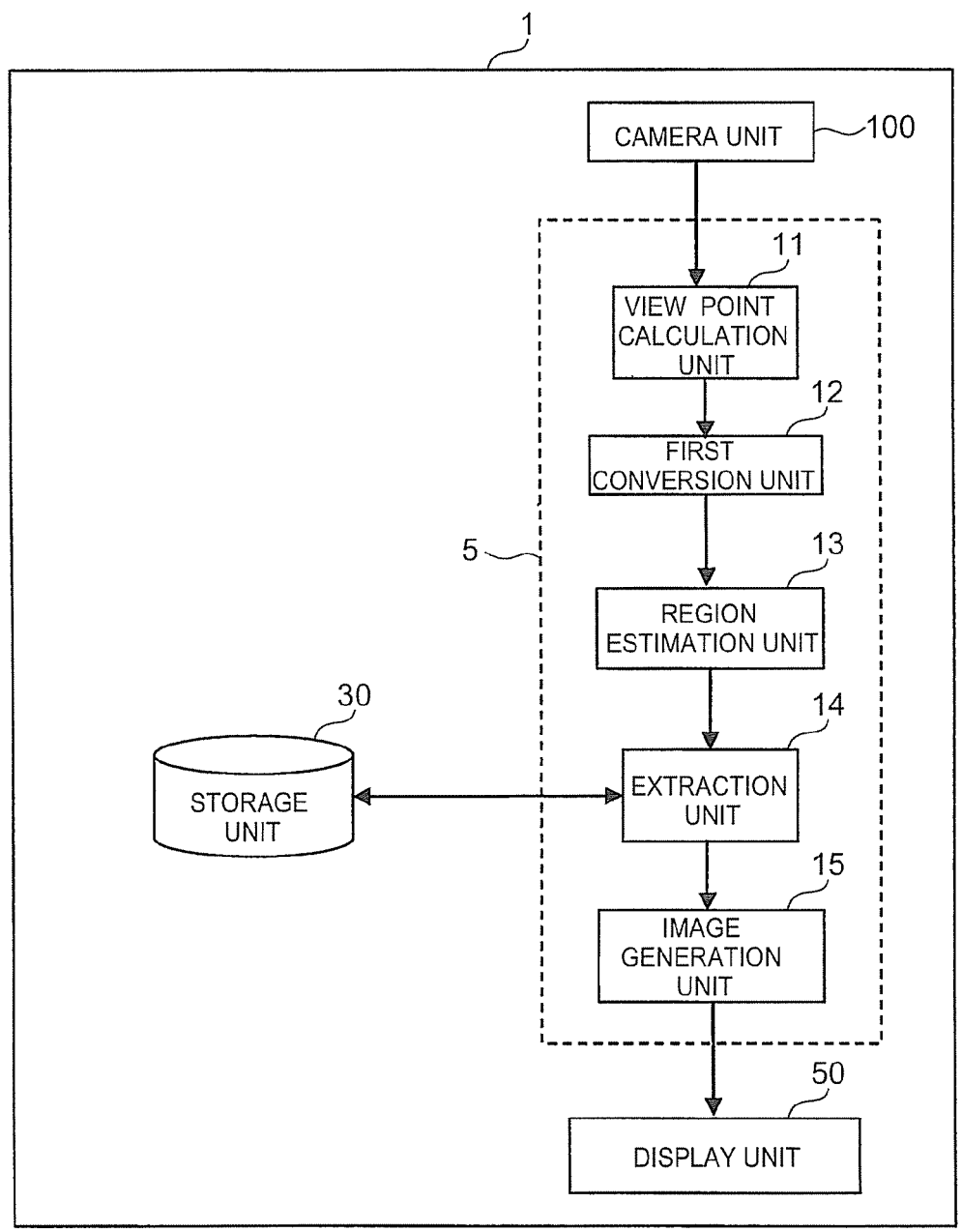
FIG. 2 is a block diagram of the information display apparatus 1.

As shown in FIG. 2, the information display apparatus 1 includes a processing unit 5, a storage unit 30, a camera unit 100, and a display unit 50. The processing unit 5 includes a view point calculation unit 11, a first conversion unit 12, a region estimation unit 13, an extraction unit 14, and an image generation unit 15.

The storage unit 30 stores geographical information of a plurality of objects such as buildings or a natural things existing in a scene surrounding the information display apparatus 1. The geographical information includes location information representing object's location, and guide information representing object's name and feature.

Figure 6:
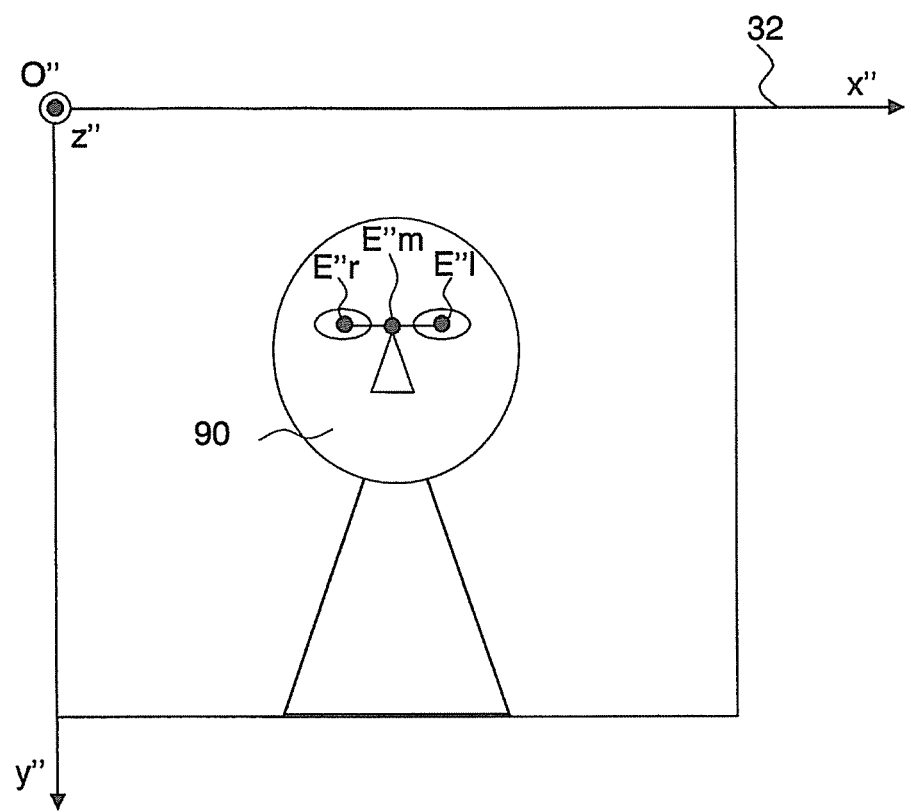
FIG. 6 is a schematic diagram of one example of a user 90 imaged by a camera unit 100.

The view point calculation unit 11 calculates a coordinate of a view point of the user 90 in a camera coordinate system 32 (explained afterwards by referring to FIG. 6). The first conversion unit 12 converts the coordinate of the view point of the user 90 in the camera coordinate system 32 to a coordinate of a view point of the user 90 in a world coordinate system 31.

The region estimation unit 13 estimates a region of a scene observed by the user 90 through the display unit 50. The extraction unit 14 extracts geographical information of at least one object existing in the region from the storage unit 30. The image generation unit 15 generates an image visualizing the geographical information of the object.

The processing unit 5 may be realized as a CPU or a memory used thereby. The storage unit 30 may be realized as a memory used by the CPU. Furthermore, the storage unit 30 may be realized by an auxiliary storage used by the CPU.

The world coordinate system 31 is a coordinate system based on the information display apparatus 1. For example, as shown in FIG. 1, a center position of a face on which the information display apparatus 1 is set may be the origin O. Furthermore, from the center position of the face, a direction to the east, a vertical direction and a direction to the south may be x-axis, y-axis and z-axis respectively.

The camera coordinate system is a coordinate system based on the camera unit 100. For example, the camera coordinate system 32 may be defined so that a left upper position on an imaging region (imaged by the camera unit 100) is the origin O, a horizontal direction is x"-axis, a vertical direction is y"-axis, and a depth direction is z"-axis.

Figure 3:
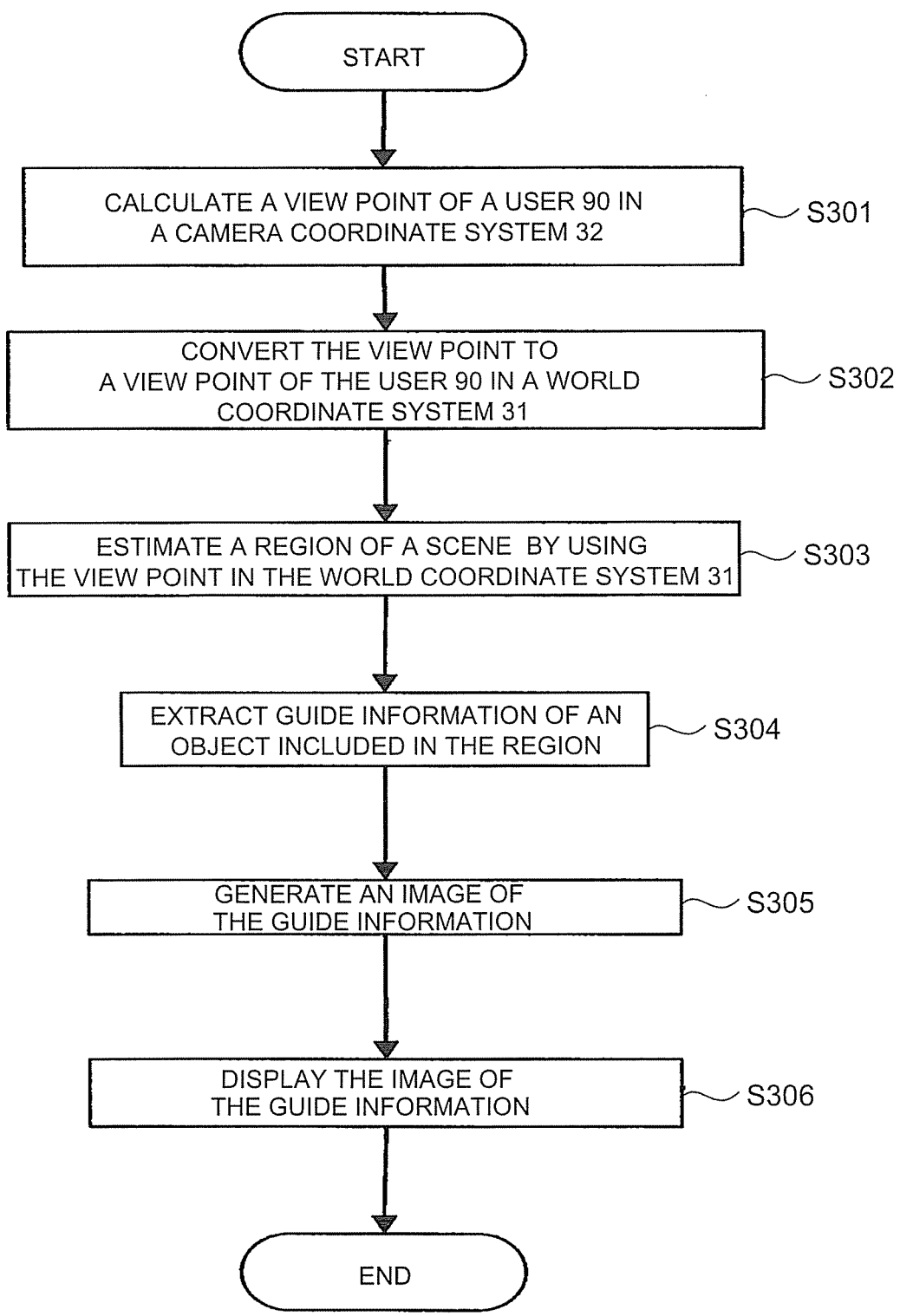
FIG. 3 is a flow chart of processing of the information display apparatus 1.

As shown in FIG. 3, the view point calculation unit 11 calculates a coordinate of a view point of the user 90 in the camera coordinate system 32 by using the camera unit 100 (S301). The first conversion unit 12 converts the coordinate of the view point of the user 90 in the camera coordinate system 32 to a coordinate of a view point of the user 90 in the world coordinate system 31 (S302). The region estimation unit 13 estimates a region of a scene observed by the user 90 through the display unit 50 (S303).

The extraction unit 14 extracts guide information of at least one object existing in the region from the storage unit 30 (S304). The image generation unit 15 generates an image visualizing the guide information of the object (S305). The display unit 50 displays the image (S306). As mentioned-above, processing of the information display apparatus 1 was explained.

Next, each unit of the information display apparatus 1 is explained in detail.

The storage unit 30 stores geographical information of a plurality of objects such as buildings or natural things existing in a scene surrounding the information display apparatus 1.

Figure 4:
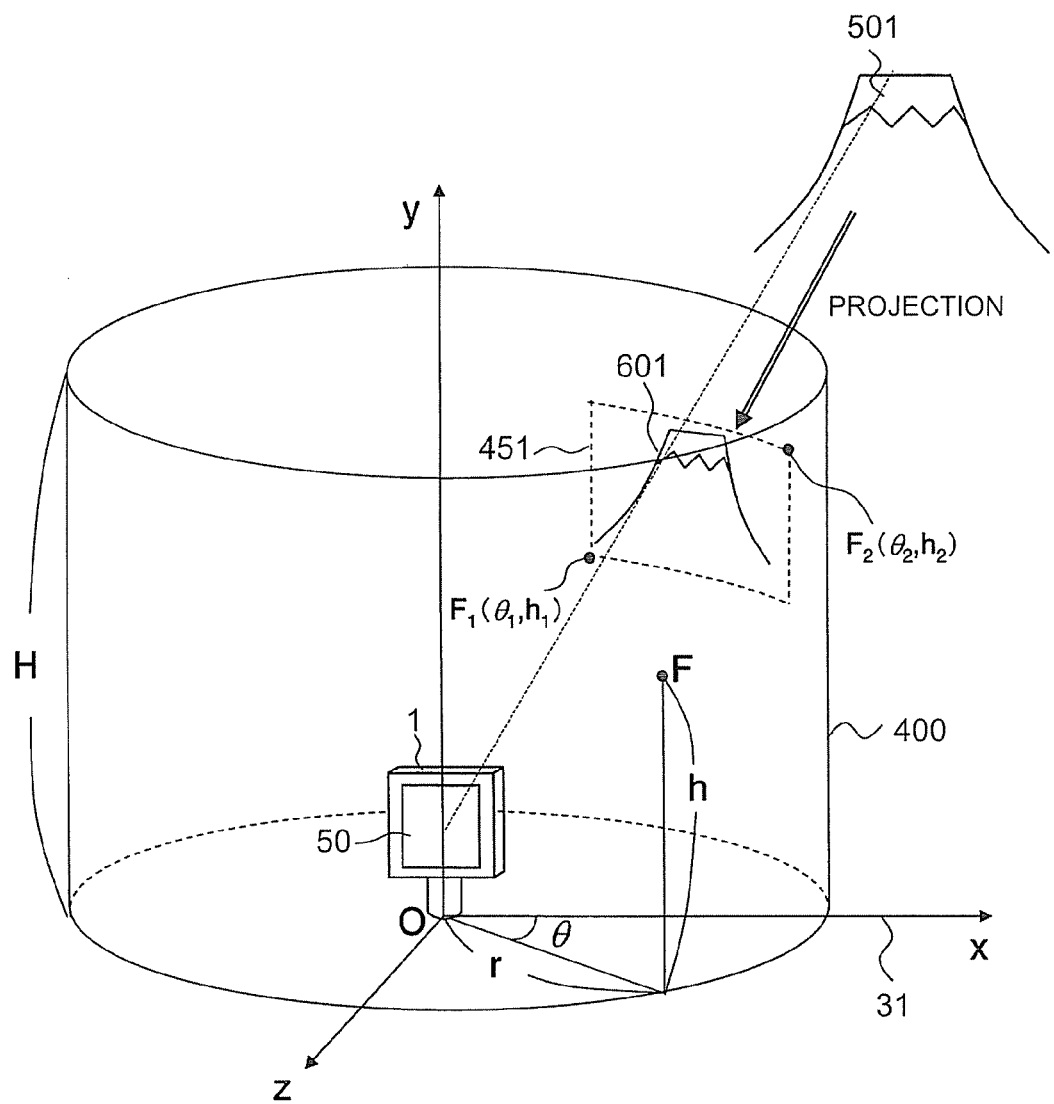
FIG. 4 is a conceptual plan of geographical information stored in a storage unit 30.

FIG. 4 is a geographical plan to explain location information in the geographical information stored in the storage unit 30. The location information is determined based on a projection image of the object. The projection image is projected onto the side of a cylinder 400 surrounding the information display apparatus 1.

Briefly, as shown in FIG. 4, a cylinder 400 having a center axis as y-axis of the world coordinate system 31, a radius "r" and a height "H" (each larger than those of the information display apparatus 1) is virtually defined. A cylindrical coordinate system (r, θ, h) is defined on condition that an angle between the radius "r" and x-axis is "θ" and a height from xz-plane is "h". In this case, a point "F" on the side of the cylinder is represented as a pair of variable (θ, h). Moreover, relationship between the world coordinate system 31 and the cylindrical coordinate system is represented as "x=r×cos θ, y=h, z=r×sin θ".

When an object is projected toward a center position of the display unit 50, location information of the object is determined as a coordinate (θ, h) of a region surrounding the projection image on the side of the cylinder 400. In this case, "r" is a constant. Accordingly, a coordinate of the region is determined as (θ, h). In the first embodiment, as to this region, a vertical direction is in parallel with y-axis, and a horizontal direction is in parallel with xz-plane. It is desired that this region can surround a projection image of the object, and an area of this region is minimized. This region can be determined by two points on a diagonal line thereof.

For example, in FIG. 4, when an object 501 is projected toward a center position of the display unit 50, location of the object 501 can be determined as a region 451 surrounding a projection image 601 on the side of the cylinder 400. The region 451 is defined as two points $F_1(\theta_1, h_1)$ and $F_2(\theta_2, h_2)$. Accordingly, location information of the object 501 is represented as two points $F_1(\theta_1, h_1)$ and $F_2(\theta_2, h_2)$.

FIG. 5 shows one example of geographical information stored in the storage unit 30. As shown in FIG. 5, the storage unit 30 correspondingly stores the geographical information, i.e., an object ID as an identification number of the object, location information of the object, and guide information of the object. The storage unit 30 may be a relational database.

In FIG. 5, for example, as to the object ID "001", guide information such as a name "○○ mountain" of the object 501, and an explanation (text data) describing a feature of the object 501, is corresponded. Furthermore, location information of the object 501 represented as two points "$F_1(\theta_1, h_1)$, $F_2(\theta_2, h_2)$" is corresponded.

For example, as to the object ID "002", guide information such as a name "X X tower" of the object 502, and an explanation (text data) describing a feature of the object 502, is corresponded. Furthermore, location information of the object 502 represented as two points "$F_3(\theta_3, h_3)$, $F_4(\theta_4, h_4)$" is corresponded.

Moreover, as to the guide information, except for "name" and "explanation", a route to reach the object, an image of the object, or URL related to the object, may be included.

The view point calculation unit 11 calculates a view point of the user 90 by using the camera unit 100. For example, the camera unit 100 may be a video camera capable of imaging a face of the user 90. As shown in FIG. 1, the camera unit 100 may be set at upper part of the display unit 50.

FIG. 6 shows one example of a face image of the user 90 imaged by the camera unit 100. First, the view point calculation unit 11 calculates a view point of the user 90 in the camera coordinate system 32, from the face image of the user 90. In the first embodiment, as shown in FIG. 6, the camera coordinate system 32 is defined on condition that a left upper point of an imaging region (imaged by the camera unit 100) is the origin O, a horizontal direction is x-axis, a vertical direction is y-axis, and a depth direction is z-axis.

For example, the view point calculation unit 11 calculates a coordinate $E''_r(x''_r, y''_r)$ of the right eye of the user 90 and a coordinate $E''_3$. $(x''_1, y''_1)$ of the left eye of the user 90, on x"y"-plane of the camera coordinate system 32. The view point calculation unit 11 may set a middle point $E''_m(x''_m, y''_m)$ between the coordinate $E''_r$ of the right eye and the coordinate $E''_1$ of the left eye of the user 90, to a view point of the user 90 on x"y"-plane of the camera coordinate system 32. In case of specifying the user's eye from the face image of the user 90, for example, a method disclosed in JP-A 2009-128565 (kokai) can be used.

Then, the view point calculation unit 11 estimates an element "$z''_m$" along z-axis of the view point of the user 90 in the camera coordinate system 32, and calculates a coordinate $E''_m(x''_m, y''_m, z''_m)$ of the view point of the user 100 in the camera coordinate system 32. For example, "$z''_m$" is estimated by a size of the face image or a distance between both eyes in the face image from the camera unit 100. Alternatively, a distance between the display unit 50 and the view point may be previously assumed.

The first conversion unit 12 converts the view point $E''_m(x''_m, y''_m, z''_m)$ of the user 90 in the camera coordinate system 32 to a view point $E_m(x_m, y_m, z_m)$ of the user 90 in the world coordinate system. For example, by using a known position of the camera unit 100 in the world coordinate system, the first conversion unit 12 previously calculates a conversion matrix M from the camera coordinate system 32 to the world coordinate system. The first conversion unit 12 may calculate $E_m$ by multiplying $E''_m$ with M.

Figure 7:
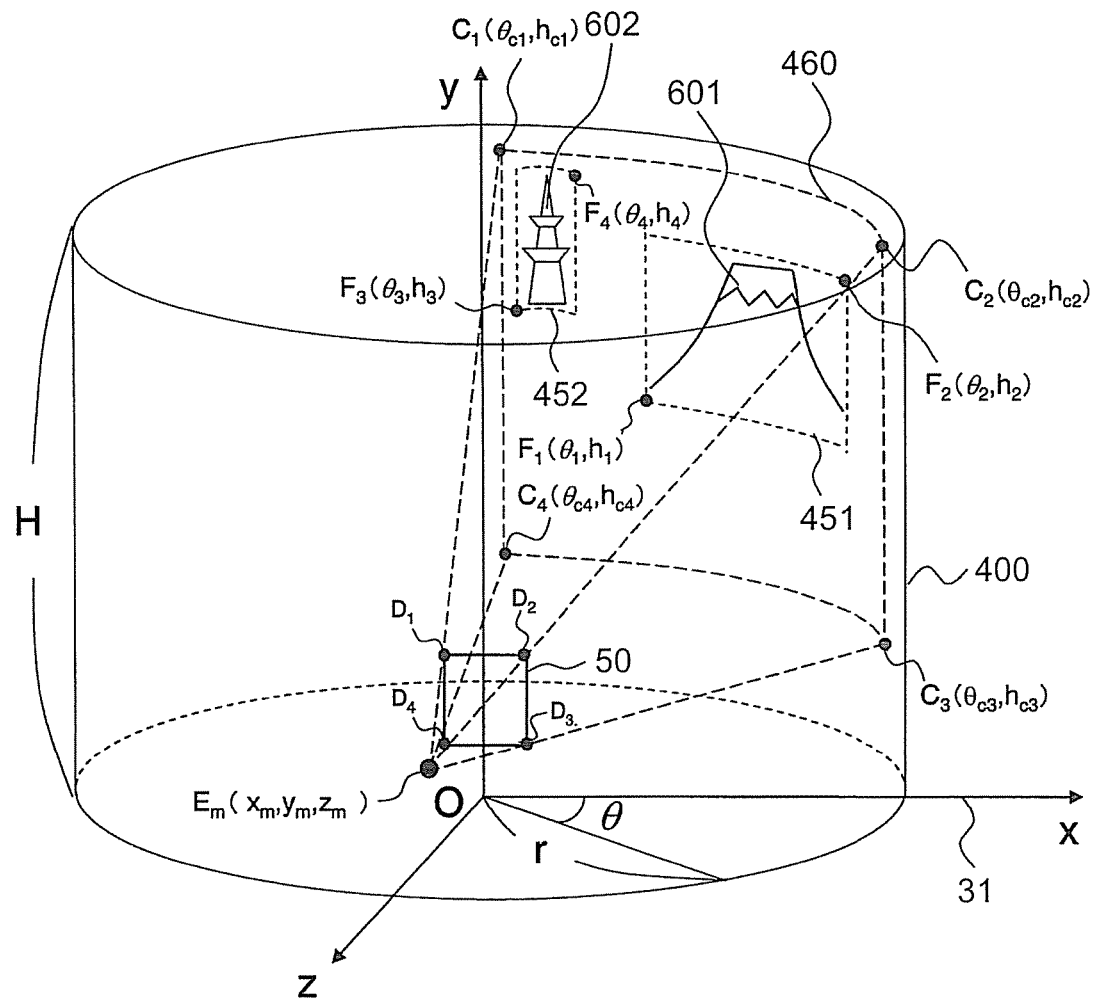
FIG. 7 is a conceptual plan of a region estimated by a region estimation unit 13.

The first conversion unit 12 supplies the view point $E_m(x_m, y_m, z_m)$ of the user 90 in the world coordinate system 31 to the region estimation unit 13. The region estimation unit 13 estimates a region of a scene observed by the user 90 through the display unit 50. FIG. 7 is a conceptual plan to explain a region estimated by the region estimation unit 13.

In a virtual space defined by the world coordinate system 31, the region estimation unit 13 generates half-straight lines $E_mD_1, E_mD_2, E_mD_3$ and $E_mD_4$ respectively extended from the view point $E_m$ of the user 90 to four vertices $D_1$, $D_2$, $D_3$ and $D_4$ on surface of the display unit 50. Assume that a cross point of each half-straight line onto the side of the cylinder 400 is $C_1$ ($\theta_{c1}$, $h_{c1}$), $C_2$ ($\theta_{c2}$, $h_{c2}$), $C_3$ ($\theta_{c3}$, $h_{c3}$) and $C_4$ ($\theta_{c4}$, $h_4$). In this case, four vertices $D_1$, $D_2$, $D_3$ and $D_4$ on surface of the display 50 in the world coordinate system 31 are previously known.

The region estimation unit 13 generates a region 460 composed by $C_1$($\theta_{c1}$, $h_{c1}$), $C_2$ ($\theta_{c2}$, $h_{c2}$) $C_3$ ($\theta_{c3}$, $h_{c3}$) and $C_4$ ($\theta_{c4}$, $h_{c4}$) on the side of the cylinder 400. The region estimation unit 13 estimates the region 460 as a scenic region observed by the user 90 through the display unit 50. The region estimation unit 13 supplies the region 460 ($C_1$($\theta_{c1}$, $h_{c1}$) $C_2$($\theta_{c2}$, $h_{c2}$) $C_3$ ($\theta_{c3}$, $h_{c3}$) $C_4$ ($\theta_{c4}$, $h_{c4}$)) to the extraction unit 14.

By retrieving the storage unit 30, the extraction unit 14 extracts guide information of an object having location included in the region 460. The extraction unit 14 may decide whether the location of the object is included in the region 460 by comparing peal coordinates ($\theta$, h) of the region 460 to vertex coordinates ($\theta$, h) of a region surrounding a projection image of the object on the side of the cylinder 400.

For example, in FIG. 7, the region 460 includes an object 501 (a region 451 surrounding a projection image 601) and an object 502 (a region 452 surrounding a projection image 602). By retrieving the storage unit 30, the extraction unit 14 extracts guide information of the object 501 (an object ID "001") and guide information of the object 502 (an object ID "002"). The extraction unit 14 supplies the guide information of one or a plurality of objects to the image generation unit 15. Moreover, even if regions of location information of a plurality of objects are partially overlapped, the extraction unit 14 may supply guide information of the plurality of objects to the image generation unit 15.

Figure 8:
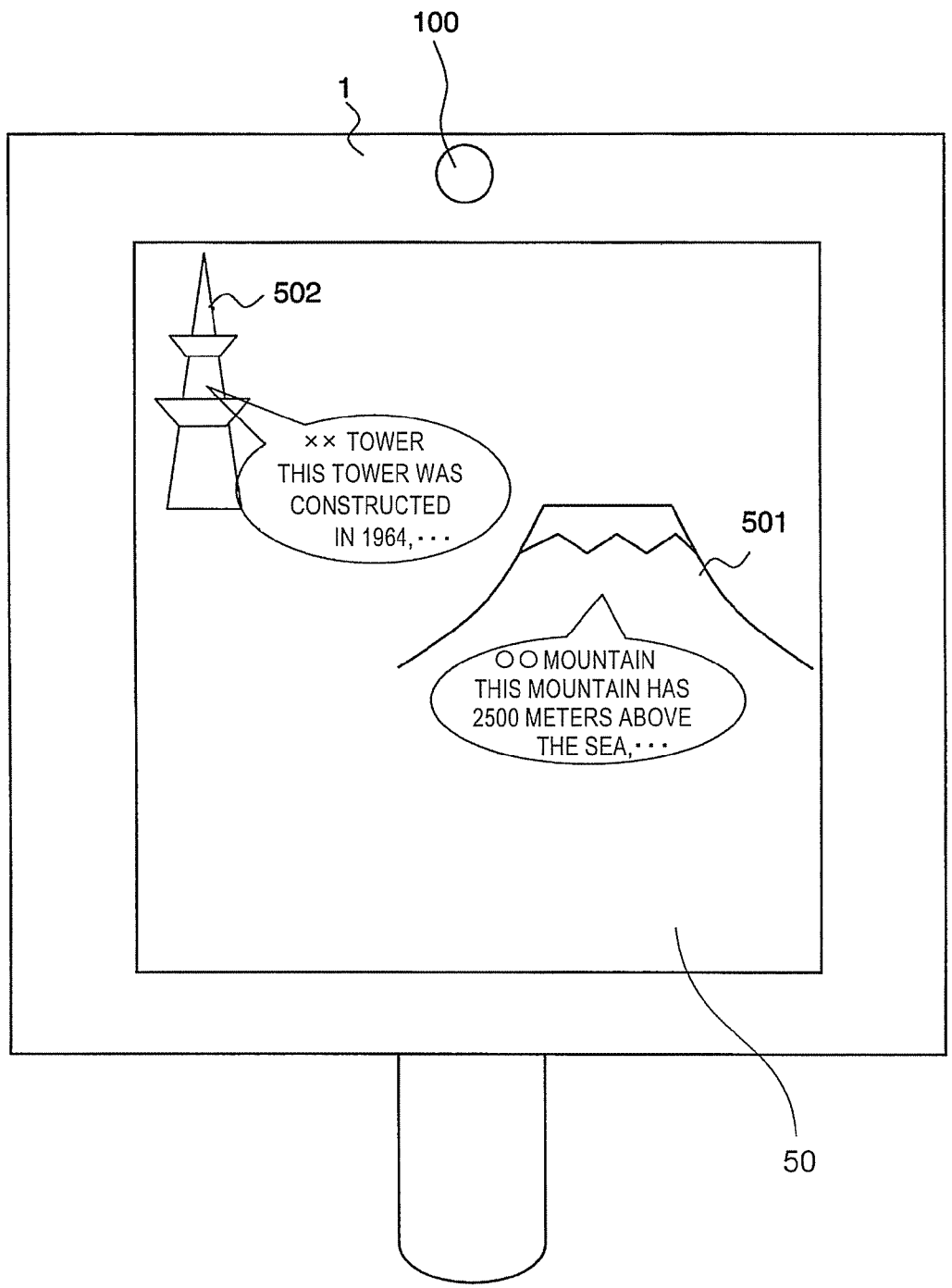
FIG. 8 is a schematic diagram of one example of a display unit 50 observed from a view point of the user 90.

The image generation unit 15 generates an image visualizing the guide information of the object extracted. FIG. 8 shows one example of the display unit 50 observed from a view point $E_m$ the user 90. By using the view point $E_m$ of the user 90, position (vertices $D_1$, $D_2$, $D_3$, $D_4$) on surface of the display unit 50 and location information ($\theta$, h) of the object in the world coordinate system, the image generation unit 15 decides a display position of the image of the guide information on the display unit 50.

Figure 9:
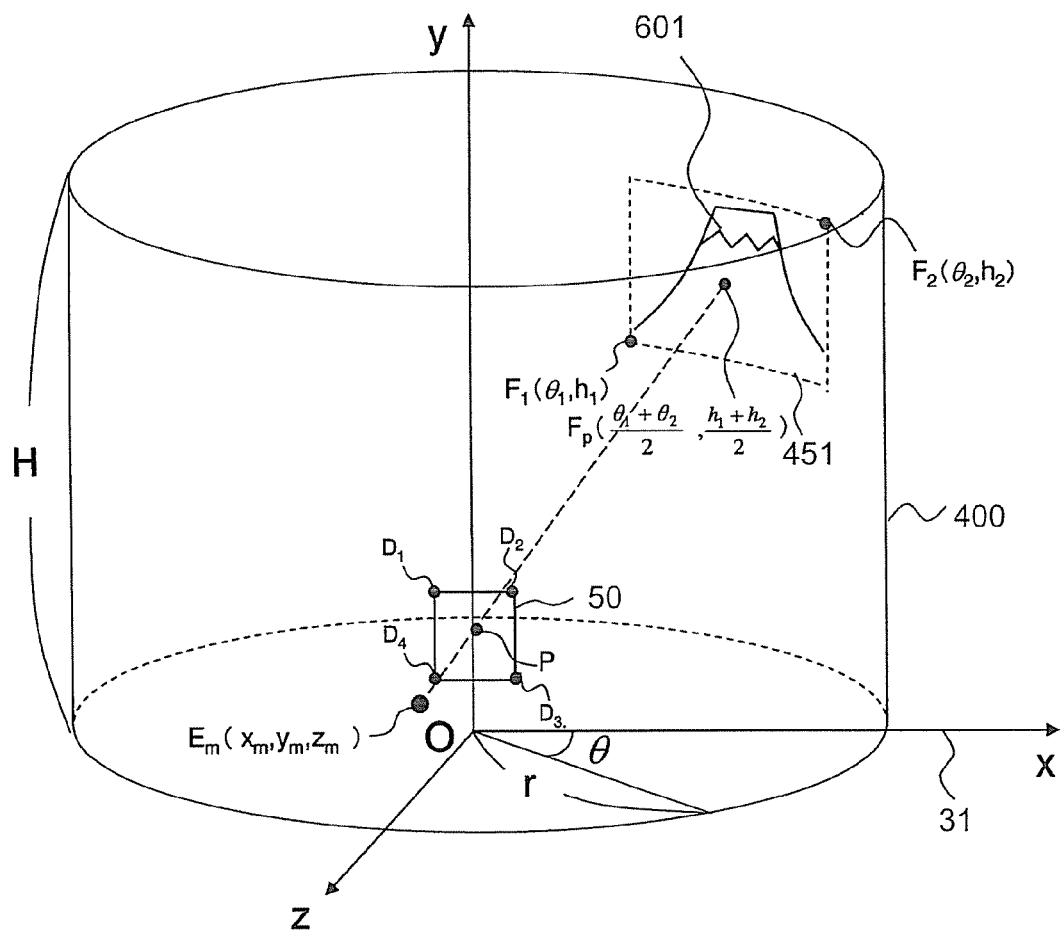
FIG. 9 is a conceptual plan to explain decision of a display position by an image generation unit 15.

FIG. 9 is a conceptual plan to explain decision of the display position by the image generation unit 15. For example, in above-mentioned virtual space, by using location information ($F_1$($\theta_1$,$h_1$) ($F_2$($\theta_2$,$h_2$)) of an object 501, the image generation unit 15 calculates a center point ($F_p$(($\theta_1$+$\theta_2$)/2, ($h_1$+$h_2$)/2) of a region 451 surrounding a projection image 601 of the object 501. The image generation unit 15 generates a half-straight line $E_mF_p$ connecting the view point $E_m$ of the user 90 and the center point $F_p$, and calculates a cross point P of the half-straight line $E_mF_p$ onto a surface of the display unit 50. The image generation unit 15 sets the cross point P as a display position of geographical information of the object 501. Furthermore, the image generation unit 15 generates an image visualizing guide information included in the geographical information.

The display unit 50 displays the image. For example, the display unit 50 may be a transparent display or a hologram screen having a projector (not shown in Fig.). Furthermore, the display unit 50 may be a display device having a half-mirror and the projector.

According to the first embodiment, the user 90 can perceive object's information overlaid on the object observed. Furthermore, even if a view point of the user is moving, the object's information in a scene observed through the display unit 50 can be clearly presented to the user 90.

(Modification 1)

Figure 10:
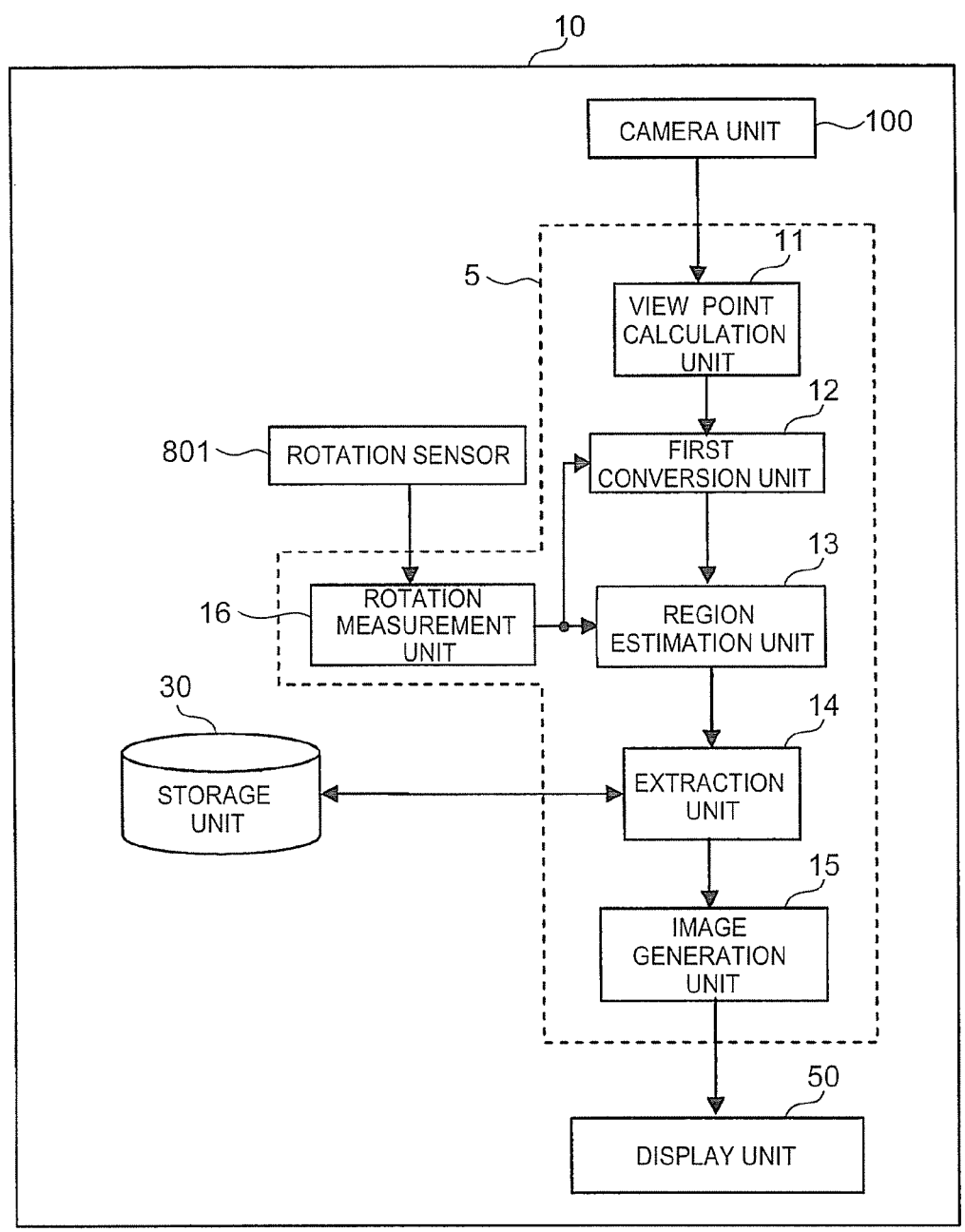
FIG. 10 is a block diagram of an information display apparatus 10 according to a first modification of the first embodiment.

As shown in FIG. 10, as to an information display apparatus 10 of modification 1 of the first embodiment, a user can operate to change a direction of the information display apparatus 10. The information display apparatus 10 includes a rotation measurement unit 16 to measure a rotation angle thereof by using a rotation sensor 801. This feature is different from the information display apparatus 1.

As the rotation sensor 801, an electronic compass or a rotary encoder can be used. By using the rotation sensor 801, the rotation measurement unit 16 measures a rotation angle of the information display apparatus 10 from a base position in the world coordinate system 31. The rotation measurement unit 16 supplies the rotation angle to the first conversion unit 12 and the region estimation unit 13. Following processing is same as the first embodiment. The information display apparatus 10 may have a handle to rotate by the user.

(Modification 2)

Figure 11:
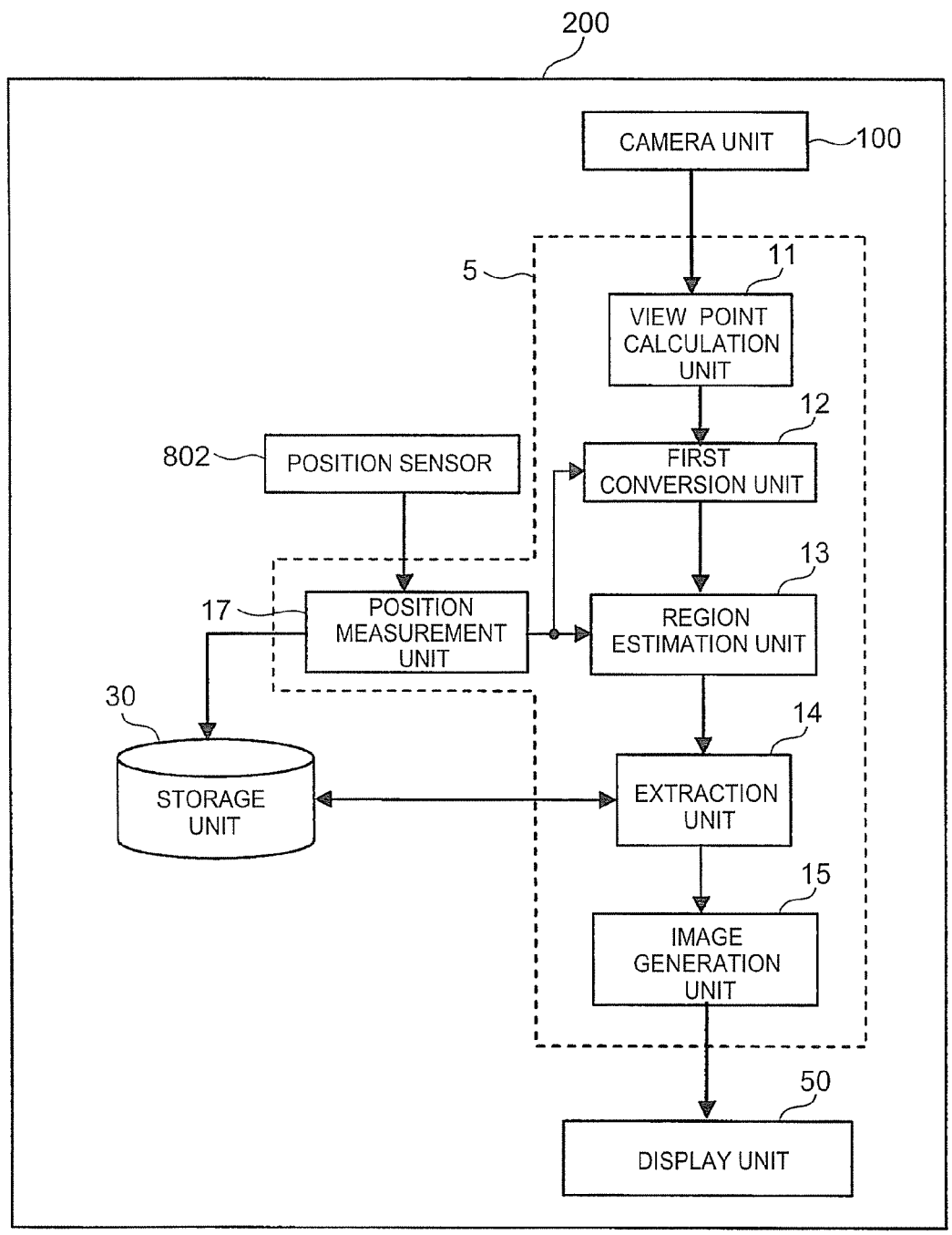
FIG. 11 is a block diagram of an information display apparatus 200 according to a second modification of the first embodiment.

As shown in FIG. 11, as to an information display apparatus 200 of modification 2 of the first embodiment, a user can operate to change a position (location) of the information display apparatus 200. The information display apparatus 200 includes a position measurement unit 17 to measure a position thereof by using a position sensor 802. This feature is different from the information display apparatus 1.

As the position sensor 802, a supersonic wave sensor, a GPS sensor, a gyro sensor, or an electronic compass, can be used. By using the position sensor 802, the position measurement unit 17 measures a position (including a direction, a height, an inclination angle) of the information display apparatus 200 from a base position in the world coordinate system 31. The position measurement unit 17 supplies the position to the first conversion unit 12 and the region estimation unit 13. Following processing is same as the first embodiment.

In this case, the storage unit 30 had better store geographical information corresponding to a position where the information display apparatus 200 has rotated. The information display apparatus 200 may have a handle to move by the user.

The Second Embodiment

Figure 12:
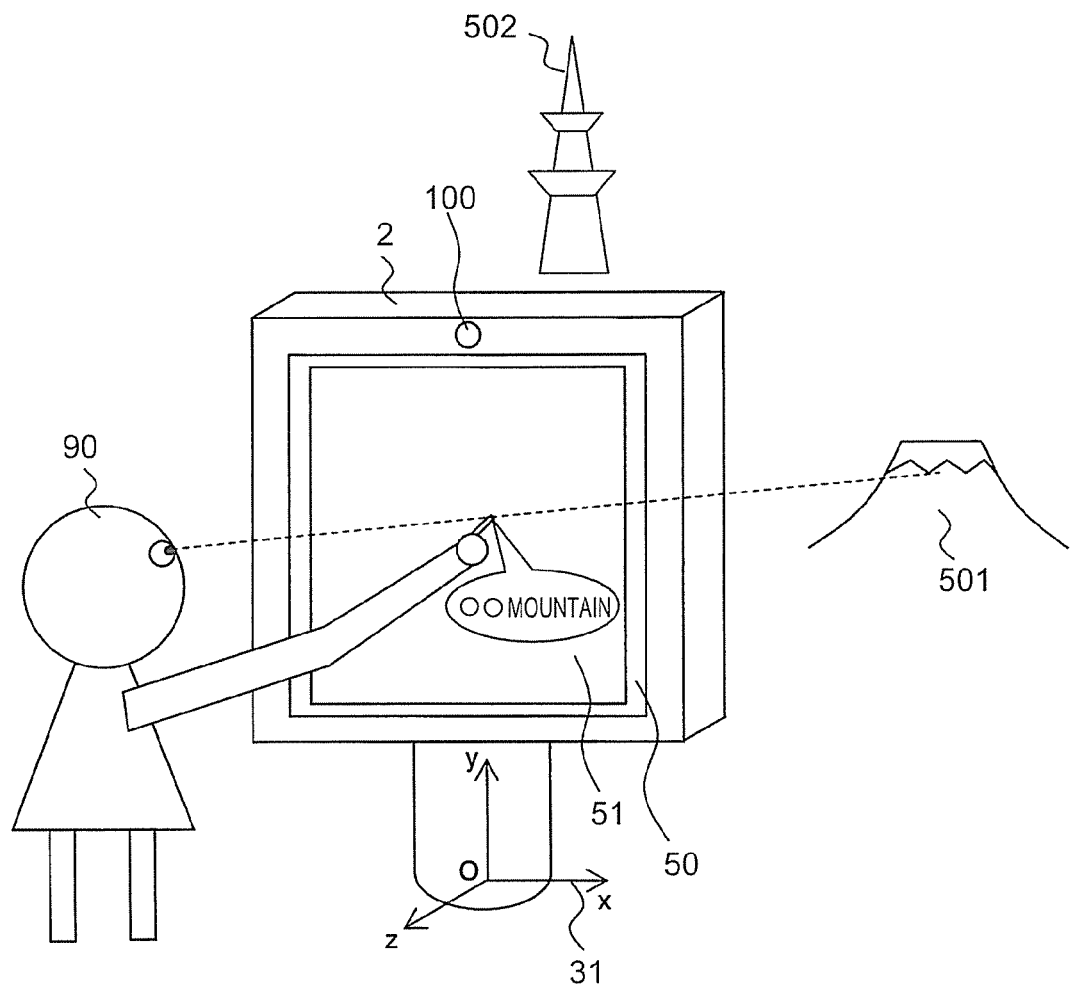
FIG. 12 is a schematic diagram showing a usage example of an information display apparatus 2 according to a second embodiment.

FIG. 12 is one example showing usage situation of an information display apparatus 2 according to the second embodiment. The information display apparatus 2 includes a touch panel 51 overlaid on the display unit 50, which is different from the first embodiment. By using a touch position on the touch panel 51 and a view point of a user 90, the information display apparatus 2 estimates an object indicated by the user 90, and displays geographical information of the object on the touch panel 51. By this processing, the user 90 can perceive geographical information of a specific object.

Figure 13:
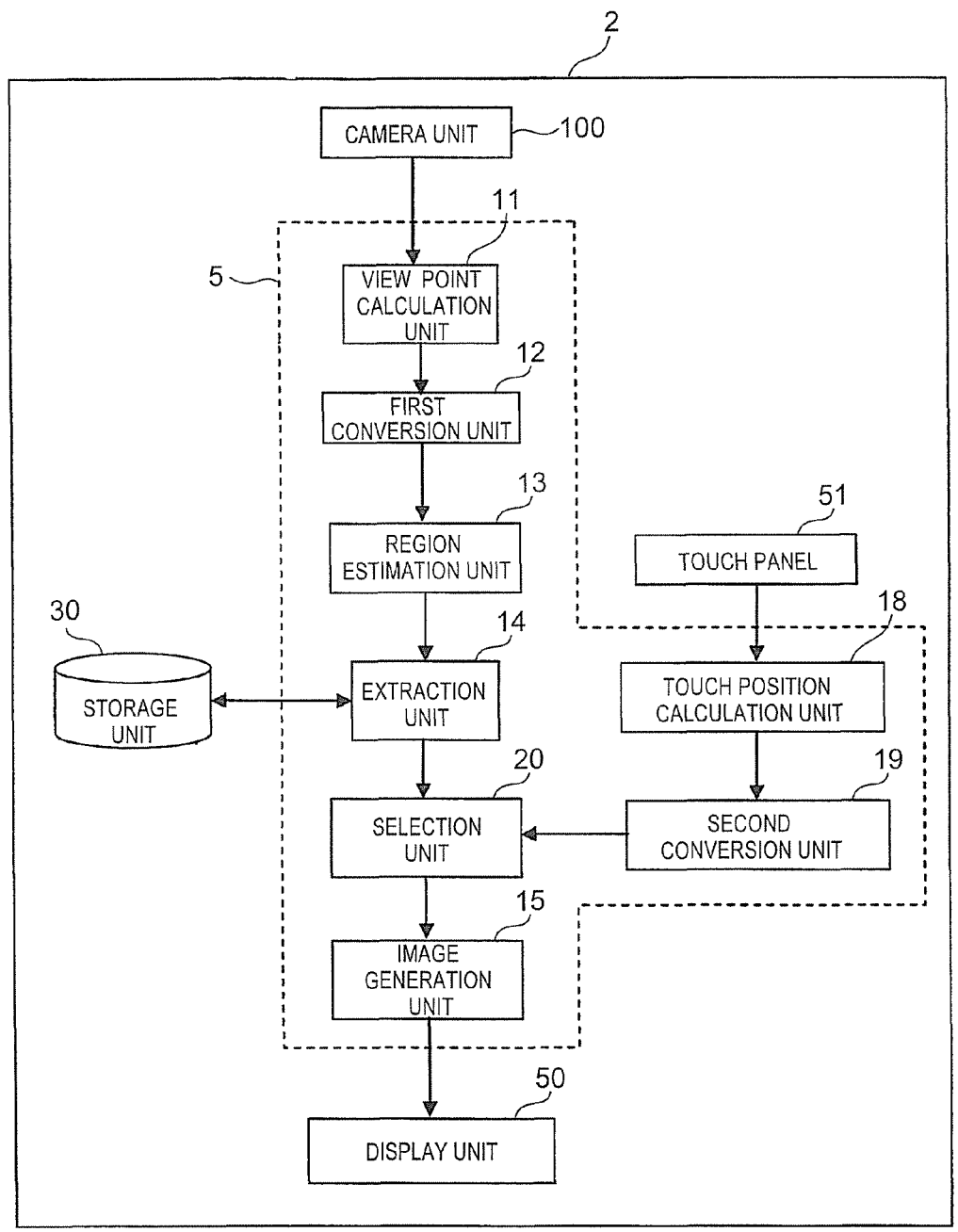
FIG. 13 is a block diagram of the information display apparatus 2.

FIG. 13 is a block diagram of the information display apparatus 2. In comparison with the information display apparatus 1, the information display apparatus 2 further includes the touch panel 51, a touch position calculation unit 18, a second conversion unit 19, and a selection unit 20.

The touch position calculation unit 18 calculates a coordinate of a position (touch position) touched by the user 90 on the touch panel 51 in a touch panel coordinate system. The second conversion unit 19 converts the coordinate of the touch position in the touch panel coordinate system to a coordinate T of the touch position in the world coordinate system 31.

By using a view point $E_m$ of the user 90 and the touch position T, the selection unit 20 selects one object indicated by the user 90 from objects extracted by the extraction unit 14.

In this case, the touch panel coordinate system is a coordinate system based on the touch panel 51. For example, the touch panel coordinate system is defined by a center position of the touch panel 51 as the origin, a horizontal direction as x'-axis, and a vertical direction as y'-axis.

Figure 14:
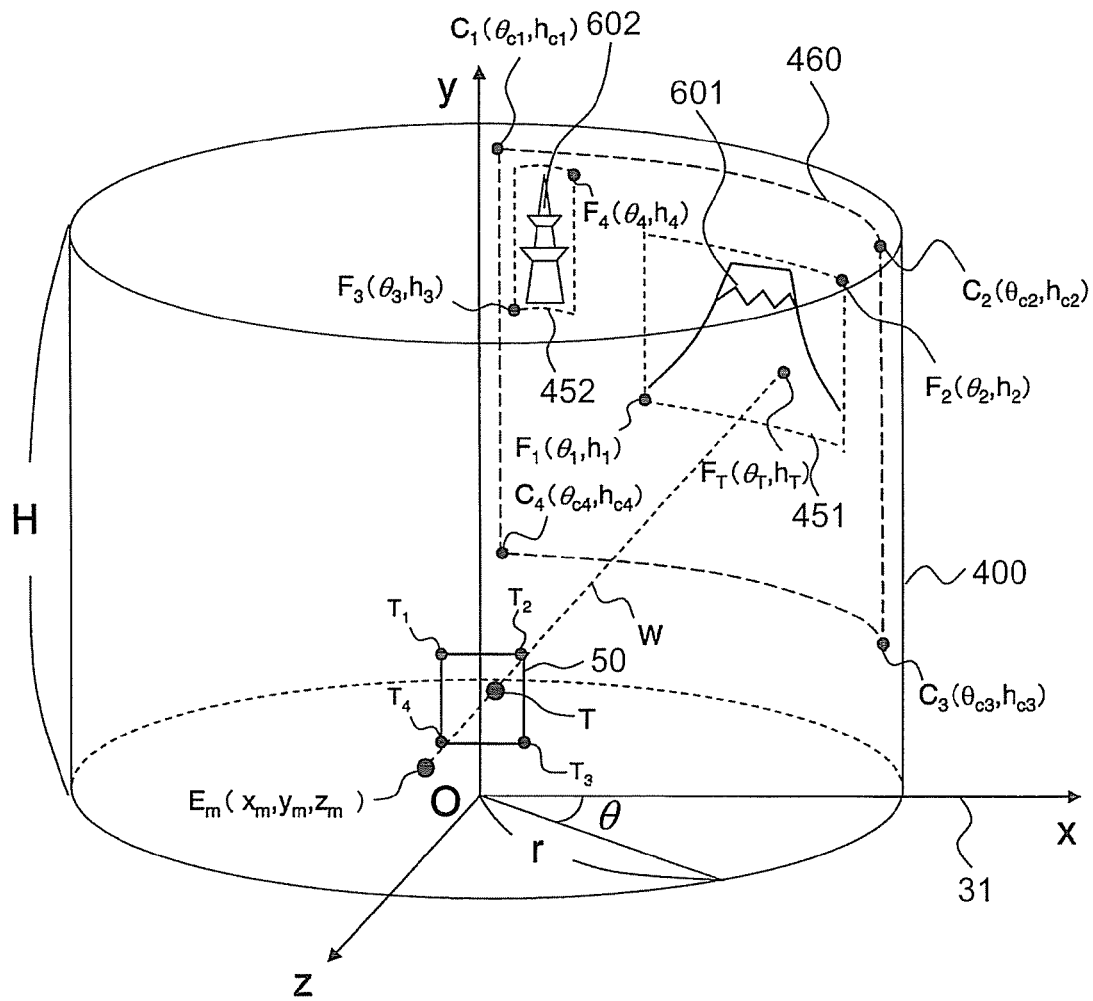
FIG. 14 is a conceptual plan to explain a method for indicating an object by a selection unit 20.

FIG. 14 is a conceptual plan to explain a method for indicating an object by the selection unit 20. In above-mentioned virtual space, the selection unit 20 generates a half-straight line $E_mT$ connecting the view point $E_m$ of the user 90 and the touch position T, and calculates a cross point $F_T(\theta_T,h_T)$ of the half-straight line $E_mT$ onto a cylinder 400. The selection unit 20 decides whether location information of a region including the cross point $F_T(\theta_T,h_T)$ exists in location information of objects extracted by the extraction unit 14. If the location information of the region including the cross point $F_T(\theta_T,h_T)$ exists, the selection unit 20 supplies guide information of an object corresponding to the location information to the image generation unit 15. By this processing, the user 90 can perceive the guide information of a specific object.

According to the second embodiment, the information display apparatus and the information display method each having higher utility for the user can be provided.

Moreover, in addition to the display unit 50, the information display apparatus 2 may equip another display (not shown in Fig.), and present detail information of an object touched on the touch panel 51 through another display.

While certain embodiments have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An apparatus for displaying information, comprising:
   a display unit through which a scene is visible, the scene surrounding the display unit;
   a storage unit configured to store a location and a guide of each object existing in the scene;
   a viewpoint calculation unit configured to calculate a view point of a user observing the scene through the display unit;
   a region estimation unit configured to estimate a region observed by the user in the scene, based on the view point; and
   an extraction unit configured to search an object existing in the region based on the location of the object, and to extract the guide of the object from the storage unit;
   wherein the display unit displays the guide extracted.

2. The apparatus according to claim 1, wherein
   the location is determined by projecting the object onto a virtual surface surrounding the display unit in a virtual space and by calculating a coordinate of a projection image on the virtual surface, and
   the region estimation unit generates a plurality of half-straight lines connecting between the view point and each corner of the display unit in the virtual space, and estimates a region enclosed by cross points of each half-straight line onto the virtual surface, as the region observed by the user in the scene.

3. The apparatus according to claim 2, further comprising:
   a touch panel overlaid on the display unit;
   a second conversion unit configured to convert a touch position on the touch panel to a touch position in a world-coordinate system; and
   a selection unit configured to select one from guides extracted by the extraction unit, based on the view point and the touch position in the world coordinate system.

4. The apparatus according to claim 3, further comprising:
   a rotation measurement unit configured to measure a rotation angle of the apparatus from a base direction;
   wherein the region estimation unit estimates the region observed by the user in the scene, based on the view point and the rotation angle.

5. A method for displaying information, comprising:
   storing in a storage unit, a location and a guide of each object existing in a scene, the scene surrounding a display unit and being visible through the display unit;
   calculating a view point of a user observing the scene through the display unit;
   estimating a region observed by the user in the scene, based on the view point;
   searching an object existing in the region based on the location of the object;
   extracting the guide of the object from the storage unit; and
   displaying the guide extracted on the display unit.

* * * * *